(12) United States Patent
Lee

(10) Patent No.: US 9,226,274 B2
(45) Date of Patent: Dec. 29, 2015

(54) METHOD AND APPARATUS OF PROVIDING A PROXIMITY-BASED SERVICE FOR PUBLIC SAFETY

(71) Applicant: LG ELECTRONICS INC., Seoul (KR)

(72) Inventor: Ki-Dong Lee, San Diego, CA (US)

(73) Assignee: LG Electronics Inc., Seoul (KR)

( * ) Notice: Subject to any disclaimer, the term of this patent is extended or adjusted under 35 U.S.C. 154(b) by 241 days.

(21) Appl. No.: 13/935,900

(22) Filed: Jul. 5, 2013

(65) Prior Publication Data

US 2014/0010179 A1 Jan. 9, 2014

Related U.S. Application Data

(60) Provisional application No. 61/668,404, filed on Jul. 5, 2012.

(51) Int. Cl.
*H04W 72/04* (2009.01)
*H04W 72/10* (2009.01)

(52) U.S. Cl.
CPC .......... *H04W 72/0406* (2013.01); *H04W 72/10* (2013.01)

(58) Field of Classification Search
None
See application file for complete search history.

(56) References Cited

U.S. PATENT DOCUMENTS

| | | | |
|---|---|---|---|
| 2012/0014332 A1 | 1/2012 | Smith et al. | |
| 2012/0071185 A1 | 3/2012 | Dayal et al. | |
| 2012/0134328 A1 | 5/2012 | Gauvreau et al. | |
| 2012/0258703 A1* | 10/2012 | Hakola et al. | 455/422.1 |
| 2013/0182668 A1* | 7/2013 | Xu et al. | 370/329 |
| 2014/0329517 A1* | 11/2014 | Van Phan et al. | 455/418 |

FOREIGN PATENT DOCUMENTS

| | | | |
|---|---|---|---|
| WO | WO/2012/040892 | * | 4/2012 |
| WO | WO/2012/078565 | * | 6/2012 |
| WO | WO 2012/078565 A1 | | 6/2012 |
| WO | WO/2013/098461 | * | 4/2013 |

OTHER PUBLICATIONS

3GPP TR 22.803 v0.3.0 (May 2012), "3rd Generation Partnership Project: Technical Specification Group SA; Feasibility Stufy for Proximity Services (ProSe) (Release 12)", Global System for Mobile Communications, May 2012, 25 pages.*

(Continued)

*Primary Examiner* — Bob Phunkulh
*Assistant Examiner* — George Atkins, Jr.
(74) *Attorney, Agent, or Firm* — Birch, Stewart, Kolasch & Birch, LLP

(57) ABSTRACT

A method and apparatus are described for performing a Proximity-based Service (ProSe) by a ProSe-enabled user equipment (UE) in a cellular communication system. A connection is established with a network via a public safety band. A scheduling request (SR) signal is transmitted to the network via the public safety band. A first resource allocation is received from the network. The ProSe is performed using the first resource allocation. If a condition including a lack of channel resources is not satisfied, the SR signal carries a first identifier used for requesting resource of the public safety band. If the condition including the lack of channel resources is satisfied, the SR signal carries a second identifier used for requesting resource of a non-public safety band.

8 Claims, 12 Drawing Sheets

(56) References Cited

OTHER PUBLICATIONS

3GPP TR 22.803 vo.3.0 (May 2012), "3rd Generation Partnership Project: Technical Specification Group SA; Feasibility Study for Proximity Services (ProSe) (Release 12)", Global System for Mobile Communications, May 2012, 25 pages.

* cited by examiner

PUCCH format 1 structure (Normal CP)

(a) Short BSR and Truncated BSR MAC control element (b) Long BSR MAC control element

METHOD AND APPARATUS OF PROVIDING A PROXIMITY-BASED SERVICE FOR PUBLIC SAFETY

Pursuant to 35 U.S.C. §119(e), this application claims the benefit of earlier filing date and right of priority to U.S. Provisional Application Ser. No. 61/668,404, filed on Jul. 5, 2012, the contents of which are hereby incorporated by reference in their entirety.

TECHNICAL FIELD

The present invention is directed to a method and an apparatus for use in a wireless communication system. Specifically, the present invention is directed to a method and an apparatus of providing a proximity-based service for public safety.

BACKGROUND ART

Generally, a wireless communication system is being developed to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may include one of a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, a Multi Carrier Frequency Division Multiple Access (MC-FDMA) and the like.

DISCLOSURE

Technical Problem

An object of the present invention is to provide a method and an apparatus of efficiently providing a Proximity-based Service (ProSe), in particular Public Safety ProSe.

It will be appreciated by persons skilled in the art that the objects that can be achieved through the present invention are not limited to what has been particularly described hereinabove and the above and other objects that the present invention can achieve will be more clearly understood from the following detailed description taken in conjunction with the accompanying drawings.

Technical Solution

As an aspect of the invention, a method of performing a Proximity-based Service (ProSe) by a Public Safety ProSe-enabled User Equipment (UE) in a cellular communication system is provided. The method comprises establishing a connection with a network via a public safety band; transmitting a Scheduling Request (SR) signal to the network via the public safety band; receiving a first resource allocation from the network; and performing the ProSe using the first resource allocation. If a condition including a lack of channel resources is not satisfied, the SR signal carries a first identifier used for requesting resource of the public safety band. If the condition including the lack of channel resources is satisfied, the SR signal carries a second identifier used for requesting resource of a non-public safety band.

Preferably, the condition may include a lack of channel resources.

Preferably, the first identifier may include a Cell Identifier (Cell ID), and the second identifier may include an identifier allocated by the network.

Preferably, the SR signal may be generated by using below sequence:

$$y^{(\tilde{p})}(n) = \frac{1}{\sqrt{P}} d(0) \cdot r_{u,v}^{(\alpha_{\tilde{p}})}(n), n = 0, 1, \ldots, N_{seq}^{PUCCH} - 1$$

where P is a number of antennas used for Physical Uplink Control Channel (PUCCH) transmission, d(0) a complex-valued symbol, $r_{u,v}^{(\alpha_{\tilde{p}})}(n)$ is a length $N_{seq}^{PUCCH}$ sequence for each of P antenna ports, and $N_{seq}^{PUCCH}$ is 12, where $r_{u,v}^{(\alpha_{\tilde{p}})}(n)$ is cyclically shifted using the first identifier or the second identifier.

Preferably, $\alpha_{\tilde{p}}$ is a cyclic shift determined using below value:

$$n_{cs}^{cell}(n_s, l) = \Sigma_{i=0}^{7} c(8 N_{symb}^{UL} \cdot n_s + 8l + i) \cdot 2^i$$

where $n_s$ is a slot number, l is a Single Carrier Frequency Division Multiple Access (SC-FDMA) symbol number, $N_{symb}^{UL}$ is a number of SC-FDMA symbols in a slot, and c(·) is a pseudo-random sequence initialized with $c_{init}$, and $c_{init}$ is the first identifier or the second identifier.

Preferably, the method may further comprise: receiving time information and a second resource allocation from the network as a result of the SR signal carrying the second identifier, wherein the second resource allocation is valid only for a time period indicated by the time information.

As another aspect of the invention, a Public Safety Proximity-based Service (ProSe)-enabled User Equipment (UE) configured to perform a ProSe in a wireless communication system is provided, in which the Public Safety ProSe-enabled UE comprises a radio frequency (RF) unit and a processor. The processor is configured to establish a connection with a network via a public safety band, to transmit a Scheduling Request (SR) signal to the network via the public safety band, to receive a first resource allocation from the network, and to perform the ProSe using the first resource allocation. If a condition including a lack of channel resources is not satisfied, the SR signal carries a first identifier used for requesting resource of the public safety band. If the condition including the lack of channel resources is satisfied, the SR signal carries a second identifier used for requesting resource of a non-public safety band.

Preferably, the condition may include a lack of channel resources.

Preferably, the first identifier may include a Cell Identifier (Cell ID), and the second identifier may include an identifier allocated by the network.

Preferably, the SR signal may be generated by using below sequence:

$$y^{(\tilde{p})}(n) = \frac{1}{\sqrt{P}} d(0) \cdot r_{u,v}^{(\alpha_{\tilde{p}})}(n), n = 0, 1, \ldots, N_{seq}^{PUCCH} - 1$$

where P is a number of antennas used for Physical Uplink Control Channel (PUCCH) transmission, d(0) a complex-valued symbol, $r_{u,v}^{(\alpha_{\tilde{p}})}(n)$ is a length $N_{seq}^{PUCCH}$ sequence for each of P antenna ports, and $N_{seq}^{PUCCH}$ is 12, where $r_{u,v}^{(\alpha_{\tilde{p}})}(n)$ is cyclically shifted using the first identifier or the second identifier.

Preferably, $\alpha_p$ is a cyclic shift determined using below value:

$$n_{cs}^{cell}(n_s,l)=\Sigma_{i=0}^{7}c(8N_{symb}^{UL}\cdot n_s+8l+i)\cdot 2^i$$

where $n_s$ is a slot number, l is a Single Carrier Frequency Division Multiple Access (SC-FDMA) symbol number, $N_{symb}^{UL}$ is a number of SC-FDMA symbols in a slot, and $c(\cdot)$ is a pseudo-random sequence initialized with $c_{init}$, and $c_{init}$ is the first identifier or the second identifier.

Preferably, the processor may be further configured to receive time information and a second resource allocation from the network as a result of the SR signal carrying the second identifier, wherein the second resource allocation is valid only for a time period indicated by the time information.

Advantageous Effects

Exemplary embodiments of the present invention have the following effects. In accordance with the embodiments of the present invention, a Proximity-based Service (ProSe), in particular Public Safety ProSe, can be efficiently provided.

It will be appreciated by persons skilled in the art that the effects that can be achieved through the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

MODE FOR INVENTION

Reference will now be made in detail to the preferred embodiments of the present invention with reference to the accompanying drawings. The detailed description, which will be given below Referring to the accompanying drawings, is intended to explain exemplary embodiments of the present invention, rather than to show the only embodiments that can be implemented according to the invention. The following embodiments of the present invention can be applied to a variety of wireless access technologies, for example, CDMA, FDMA, TDMA, OFDMA, SC-FDMA, MC-FDMA, and the like. CDMA can be implemented by wireless communication technologies, such as Universal Terrestrial Radio Access (UTRA) or CDMA2000. TDMA can be implemented by wireless communication technologies, for example, Global System for Mobile communications (GSM), General Packet Radio Service (GPRS), Enhanced Data rates for GSM Evolution (EDGE), etc. OFDMA can be implemented by wireless communication technologies, for example, IEEE 802.11 (Wi-Fi), IEEE 802.16 (WiMAX), IEEE 802.20, E-UTRA (Evolved UTRA), and the like. UTRA is a part of the Universal Mobile Telecommunications System (UMTS). 3rd Generation Partnership Project (3GPP) Long Term Evolution (LTE) is a part of Evolved UMTS (E-UMTS) that uses E-UTRA. The LTE-Advanced (LTE-A) is an evolved version of 3GPP LTE.

Although the following embodiments of the present invention will hereinafter describe inventive technical characteristics on the basis of the 3GPP LTE/LTE-A system, it should be noted that the following embodiments will be disclosed only for illustrative purposes and the scope and spirit of the present invention are not limited thereto. Specific terms used for the exemplary embodiments of the present invention are provided to aid in understanding of the present invention. These specific terms may be replaced with other terms within the scope and spirit of the present invention.

Figure 1:
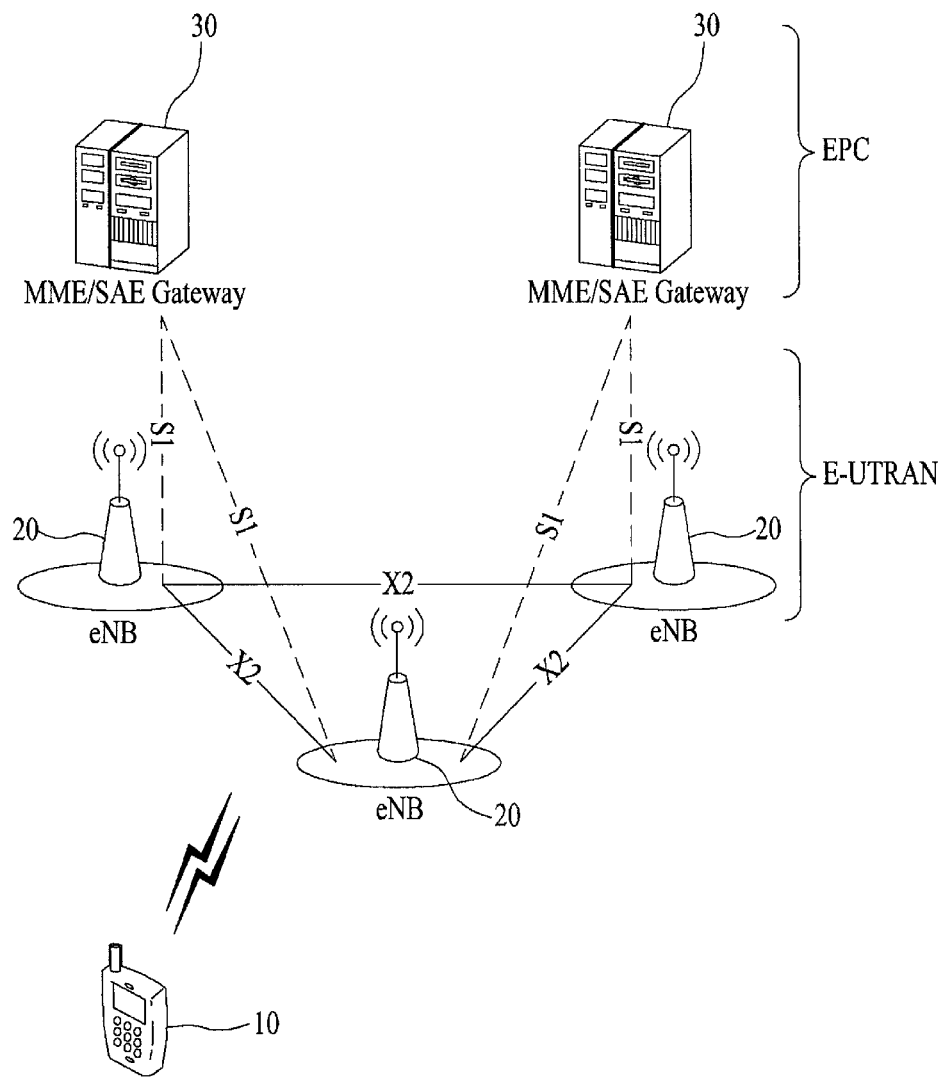
FIG. 1 illustrates a network structure of an Evolved Universal Mobile Telecommunication System (E-UMTS).

FIG. 1 illustrates a network structure of an E-UMTS. The E-UMTS may be also referred to as an LTE system. The E-UMTS is widely deployed to provide a variety of communication services such as voice and packet data, and is generally configured to function based upon the various techniques presented herein and discussed in more detail with regard to later figures.

Referring to FIG. 1, the E-UMTS network includes an Evolved UMTS Terrestrial Radio Access Network (E-UTRAN), an Evolved Packet Core (EPC), and one or more mobile terminals (or User Equipment (UE)) 10. The E-UTRAN includes one or more eNodeBs (eNBs) 20. Regarding the EPC, Mobility Management Entity/System Architecture Evolution (MME/SAE) gateway 30 provides an end point of a session and mobility management function for the UE 10. The eNB 20 and the MME/SAE gateway 30 may be connected via an S1 interface.

The UE 10 is a communication device carried by a user and may also be referred to as a Mobile Station (MS), a User Terminal (UT), a Subscriber Station (SS) or a wireless device. In general, the UE includes a transmitter and processor, among other components, and is configured to operate in accordance with the various techniques presented herein.

The eNB 20 is generally a fixed station that communicates with the UE 10. In addition to being referred to as a base station, the eNB 20 may also be referred to as an access point. An eNB 20 provides end points of a user plane and a control plane to the UE 10. In general, the eNB includes a transmitter and processor, among other components, and is configured to operate in accordance with the various techniques presented herein.

A plurality of UEs 10 may be located in one cell. One eNB 20 is typically deployed per cell. An interface for transmitting user traffic or control traffic may be used between eNBs 20. Here, "downlink (DL)" refers to communication from the eNB 20 to the UE 10, and "uplink (UL)" refers to communication from the UE to the eNB.

The MME gateway 30 provides various functions including distribution of paging messages to eNBs 20, security control, idle state mobility control, SAE bearer control, and ciphering and integrity protection of Non-Access Stratum (NAS) signaling. The SAE gateway 30 provides assorted functions including termination of U-plane packets for paging reasons, and switching of the U-plane to support UE mobility.

A plurality of nodes may be connected between eNB 20 and gateway 30 via the S1 interface. The eNBs 20 may be connected to each other via an X2 interface and neighboring eNBs may have a meshed network structure that has the X2 interface.

Figure 2:
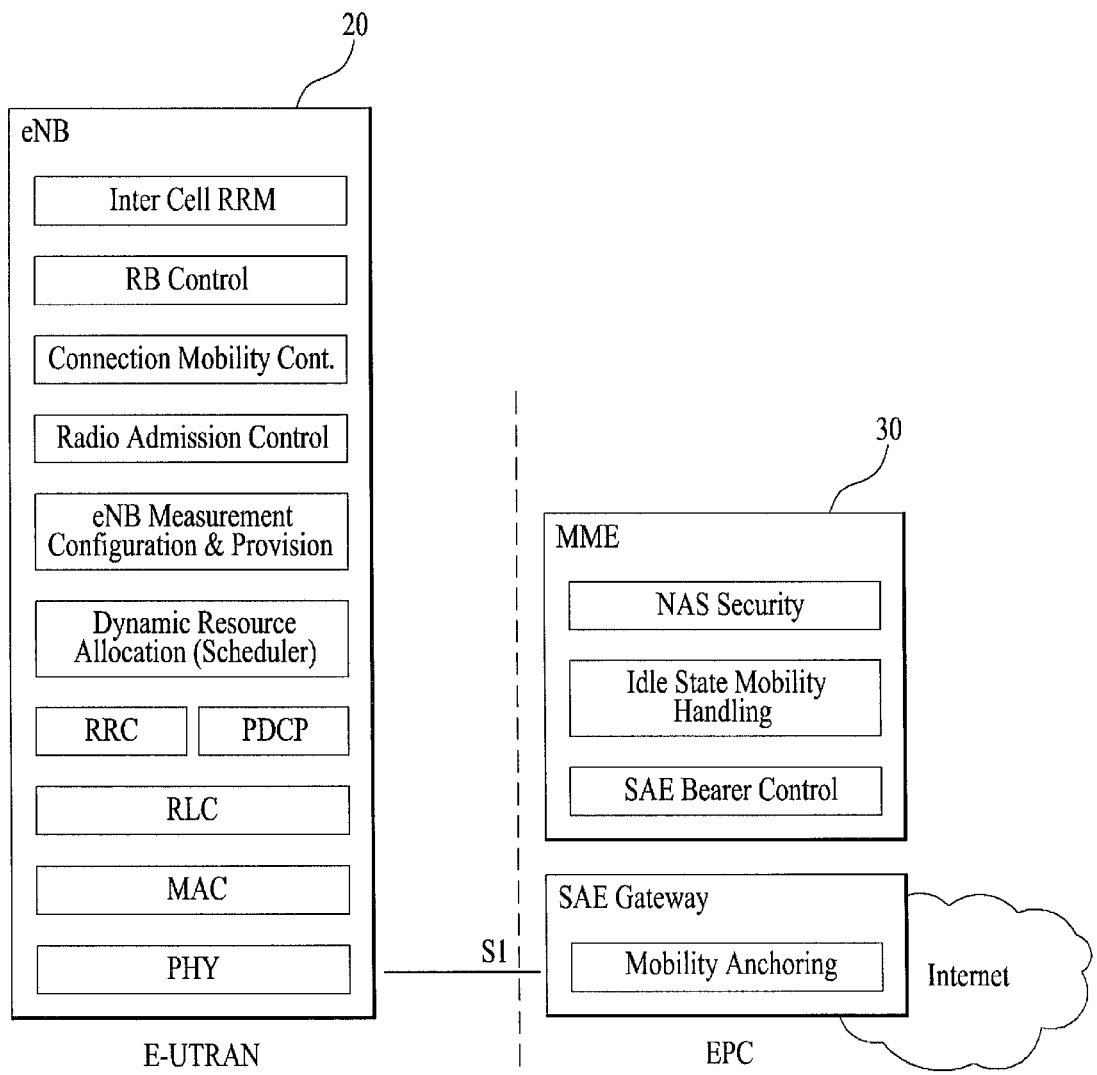
FIG. 2 illustrates a general functional structure of a typical E-UTRAN and that of a typical Evolved Packet Core (EPC).

FIG. 2 is a block diagram depicting general structures of an E-UTRAN and a EPC. Referring to FIG. 2, eNB 20 may perform functions of selection for MME/SAE gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNB measurements, radio bearer control, Radio Admission Control (RAC), and connection mobility control in LTE ACTIVE state.

In the EPC, and as described above, MME/SAE gateway 30 may perform functions of paging origination, LTE-IDLE state management, ciphering of the user plane, SAE bearer control, and ciphering and integrity protection of NAS signaling.

Figure 3A:
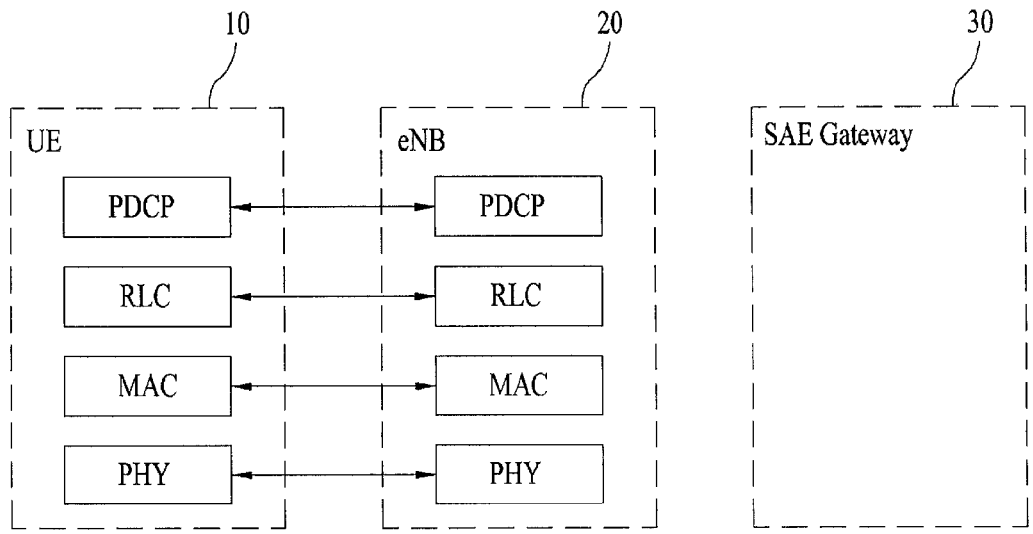
FIGS. 3a~3b illustrate a user-plane protocol and a control-plane protocol stack for the E-UMTS network.
Figure 3B:
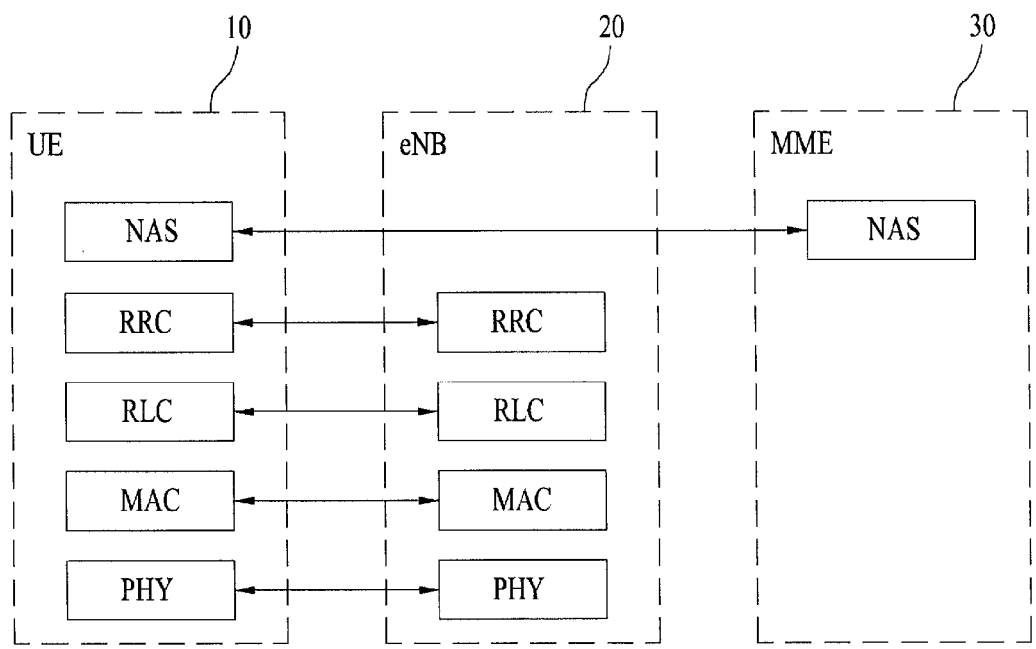

FIGS. 3a~3b illustrate the user-plane protocol and the control-plane protocol stack for the E-UMTS network. Referring to FIGS. 3a~3b, the protocol layers may be divided into a first layer (L1), a second layer (L2) and a third layer (L3) based upon the three lower layers of an Open System Interconnection (OSI) standard model as known in the art of communication systems.

The first layer L1 (or the physical layer) provides an information transmission service to an upper layer using a physical channel. The physical layer is connected with a Medium Access Control (MAC) layer through a transport channel, and data between the MAC layer and the physical layer are transferred via the transport channel. Between different physical layers, namely, between physical layers of a transmission side and a reception side (for example, between physical layers of UE 10 and eNB 20), data are transferred via the physical channel.

The MAC layer of Layer 2 (L2) provides services to a Radio Link Control (RLC) layer via a logical channel. The RLC layer of Layer 2 (L2) supports a reliable transmission of data. Although the RLC layer is shown in FIGS. 3a~3b as being separate from the MAC layer, it is understood that the functions of the RLC layer may be performed by the MAC layer and that, therefore, a separate RLC layer is not required. Referring to FIG. 3a, the Packet Data Convergence Protocol (PDCP) layer of Layer 2 (L2) performs a header compression function that reduces unnecessary control information such that data being transmitted by employing Internet Protocol (IP) packets, such as IPv4 or IPv6, can be efficiently sent over a radio (wireless) interface that has a relatively narrow bandwidth.

Referring to FIG. 3b, a Radio Resource Control (RRC) layer located at the lowest portion of the third layer (L3) is typically only defined in the control plane and controls logical channels, transport channels and the physical channels in relation to the configuration, reconfiguration, and release of the Radio Bearers (RBs). Here, the RB means a service provided by the second layer (L2) for data transmission between the terminal and the E-UTRAN.

Referring to FIG. 3a, the RLC and MAC layers (terminated in an eNB 20 on the network side) may perform functions such as Scheduling, Automatic Repeat reQuest (ARQ), and Hybrid Automatic Repeat reQuest (HARQ). The PDCP layer (terminated in eNB 20 on the network side) may perform the user plane functions such as header compression, integrity protection, and ciphering.

Referring to FIG. 3b, the RLC and MAC layers (terminated in an eNB 20 on the network side) perform the same or similar functions as for the control plane. The RRC layer (terminated in an eNB 20 on the network side) may perform functions such as broadcasting, paging, RRC connection management, RB control, mobility functions, and UE measurement reporting and controlling. The NAS control protocol (terminated in the MME 30 on the network side) may perform functions such as a SAE bearer management, authentication, LTE_IDLE mobility handling, paging origination in LTE_IDLE, and security control for the signaling between the gateway and UE 10.

The NAS control protocol may use three different states: first, a LTE_DETACHED state if there is no RRC entity; second, a LTE_IDLE state if there is no RRC connection while storing minimal UE information; and third, an LTE_ACTIVE state if the RRC connection is established.

Thus RRC state may be divided into two different states such as an RRC_IDLE state and an RRC_CONNECTED state. In the RRC_IDLE state, the UE 10 may receive broadcasts of system information and paging information while the UE specifies a Discontinuous Reception (DRX) configured by NAS, and the UE has been allocated an identification (ID) (e.g., System Architecture Evolution-Temporary Mobile Subscriber Identity (S-TMSI)) which uniquely identifies the UE in a tracking area. Also, in the RRC-IDLE state, no RRC context is stored in the eNB.

In the RRC_IDLE state, the UE 10 specifies the paging DRX (Discontinuous Reception) cycle. Specifically, the UE 10 monitors a paging signal at a specific paging occasion of every UE specific paging DRX cycle.

In the RRC_CONNECTED state, the UE 10 has an E-UTRAN RRC connection and a RRC context is stored in the E-UTRAN, such that transmitting and/or receiving data to/from the network (eNB) becomes possible. Also, the UE 10 can report channel quality information and feedback information to the eNB.

In RRC_CONNECTED state, the E-UTRAN knows the cell to which the UE 10 belongs. Therefore, the network can transmit and/or receive data to/from UE 10, the network can control mobility (handover) of the UE.

Figure 4:
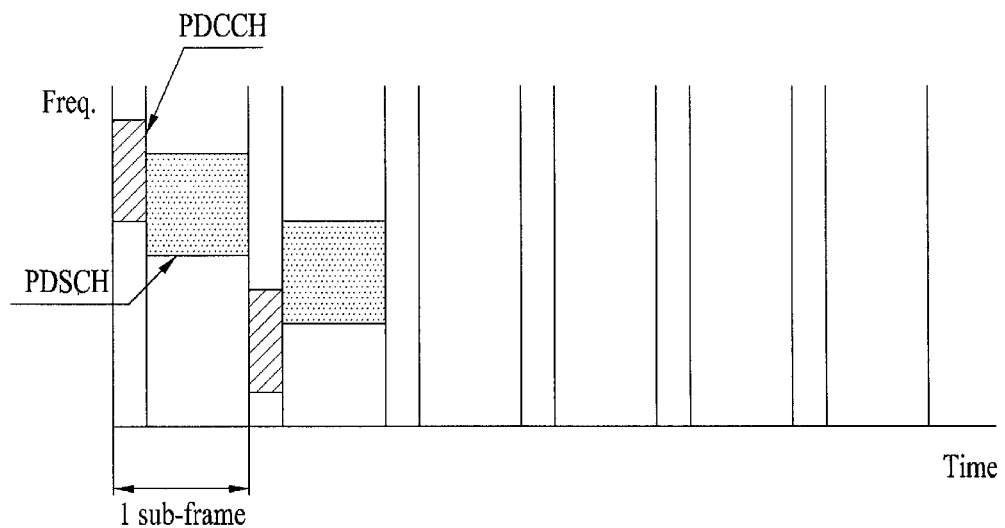
FIG. 4 illustrates a downlink subframe and physical channels.

FIG. 4 illustrates a downlink subframe and physical channels.

Referring to FIG. 4, the downlink subframe includes a plurality of slots (e.g., two). The number of OFDM symbols included in one slot may be changed according to the length of a Cyclic Prefix (CP). For example, in case of a normal CP, the slot may include seven OFDM symbols. The downlink subframe is divided into a data region and a control region in a time domain. A maximum of three (or four) OFDM symbols located in the front part of a first slot of the subframe may correspond to a control region to which a control channel is allocated. The remaining OFDM symbols correspond to a data region to which a Physical Downlink Shared Channel (PDSCH) is allocated. A variety of downlink control channels may be used in LTE/LTE-A, for example, a Physical Control Format Indicator Channel (PCFICH), a Physical Downlink Control Channel (PDCCH), a Physical hybrid ARQ indicator Channel (PHICH), etc. The PCFICH is transmitted on the first OFDM symbol of the subframe, and carries information about the number of OFDM symbols used for transmitting control channels within the subframe. The PHICH carries a Hybrid Automatic Repeat reQuest Acknowledgment/Negative-Acknowledgment (HARQ ACK/NACK) signal as a response to an uplink transmission signal.

Control information transmitted over a PDCCH is referred to as Downlink Control Information (DCI). DCI includes resource allocation information for either a UE or a UE group and other control information. For example, DCI includes UL/DL scheduling information, an UL transmission (Tx) power control command, etc.

The PDCCH carries a variety of information, for example, transmission format and resource allocation information of a DownLink Shared Channel (DL-SCH), transmission format and resource allocation information of an UpLink Shared Channel (UL-SCH), paging information transmitted over a Paging Channel (PCH), system information transmitted over the DL-SCH, resource allocation information of an upper-layer control message such as a random access response transmitted over PDSCH, a set of Tx power control commands of each UE contained in a UE group, a Tx power control command, activation indication information of Voice over IP (VoIP), and the like. A plurality of PDCCHs may be transmitted within a control region. A UE can monitor a plurality of PDCCHs. A PDCCH is transmitted as an aggregate of one or more contiguous Control Channel Elements (CCEs). The CCE is a logical allocation unit that is used to provide a coding rate based on a radio channel state to a PDCCH. The CCE may correspond to a plurality of Resource Element Groups (REGs). The format of PDCCH and the number of PDCCH bits may be determined according to the number of CCEs. A Base Station (BS) decides a PDCCH format according to DCI to be sent to the UE, and adds a Cyclic Redundancy Check (CRC) to control information. The CRC is masked with an identifier (e.g., Radio Network Temporary Identifier (RNTI)) according to a PDCCH owner or a purpose of the PDCCH. For example, provided that the PDCCH is provided for a specific UE, a CRC may be masked with an identifier of the corresponding UE (e.g., cell-RNTI (C-RNTI)). If PDCCH is provided for a paging message, a CRC may be masked with a paging identifier (e.g., Paging-RNTI (P-RNTI)). If a PDCCH is provided for system information (e.g., System Information Block (SIB)), a CRC may be masked with system Information RNTI (SI-RNTI). If PDCCH is provided for a random access response, a CRC may be masked with Random Access-RNTI (RA-RNTI). For example, CRC masking (or scrambling) may be performed using an exclusive OR (XOR) operation between CRC and RNTI at a bit level.

Figure 5:
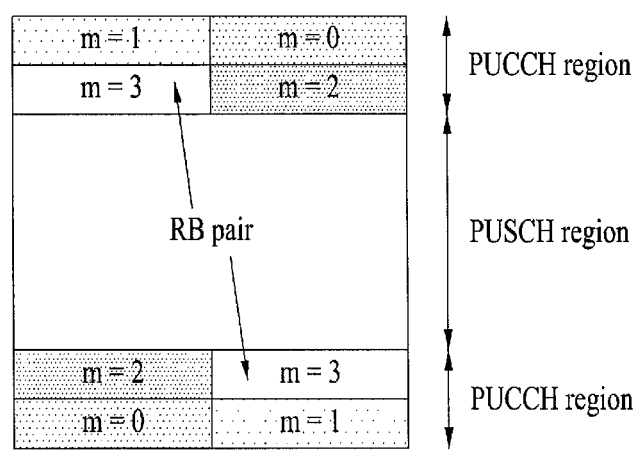
FIG. 5 illustrates a structure of an uplink subframe.

FIG. 5 illustrates a structure of a UL subframe.

Referring to FIG. 5, the UL subframe includes a plurality of slots (e.g., two). Each slot may include SC-FDMA symbols, the number of which varies according to the length of a CP. For example, in the case of a normal CP, a slot may include seven SC-FDMA symbols. A UL subframe is divided into a data region and a control region. The data region includes a PUSCH and is used to transmit a data signal such as voice. The control region includes a PUCCH and is used to transmit control information. The PUCCH includes an RB pair (e.g., m=0, 1, 2, 3) located at both ends of the data region on the frequency axis and hops between slots. The UL control information (that is, UCI) includes HARQ ACK/NACK, Channel Quality Information (CQI), Precoding Matrix Indicator (PMI) and Rank Indication (RI).

Figure 6:
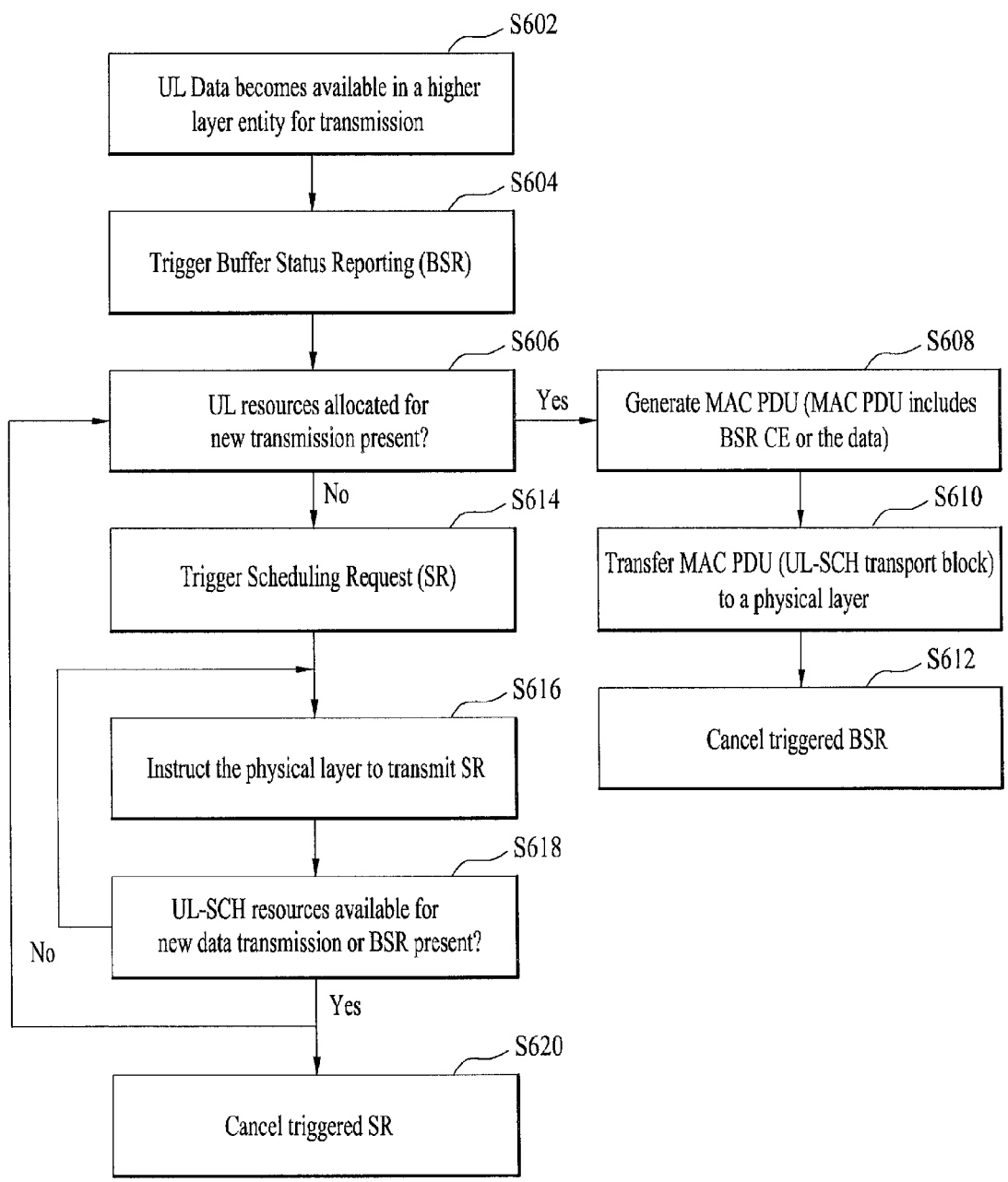
FIG. 6 illustrates a flowchart of UL transmission process.

FIG. 6 shows a UL transmission process according to the existing 3GPP Rel-8/9. FIG. 6 shows a Buffer Status Report (BSR) and SR processes of a MAC layer.

Referring to FIG. 6, if UL data becomes available for transmission in a higher layer entity (e.g., an RLC entity or a PDCP entity) (S602), a BSR process is triggered (S604). The BSR process is used to provide information about the amount of available data for transmission in a UL buffer of a UE to a serving eNB. If the BSR process is triggered, the MAC layer determines whether UL resources (e.g., UL-SCH resources) allocated for new transmission are present (S606). If the allocated UL-SCH resources are present, the MAC layer generates a MAC PDU (S608). The MAC PDU may include pending data available for transmission and/or BSR MAC control element (CE). Thereafter, the MAC layer transfers the generated MAC PDU to a physical (PHY) layer (S610). The MAC PDU is transferred to the PHY layer via a UL-SCH channel. In view of the PHY layer, the MAC PDU is a UL-SCH transmission block. Thereafter, the triggered BSR process is cancelled (S612). If pending data is present in the buffer after the BSR MAC CE is transmitted, the eNB may allocate UL-SCH resources to the UE in consideration of the BSR and the UE may transmit pending data using the allocated resources.

In contrast, if the UL resources allocated for new transmission are not present, the SR process is triggered (S614). The SR process is used to request UL-SCH resources for new transmission. If the SR process is triggered, the MAC layer instructs the PHY layer to signal an SR (S616). The PHY layer transmits the SR on an SR subframe (a subframe configured for SR transmission) according to the instruction of the MAC layer. Thereafter, the MAC layer determines whether UL-SCH resources available for new data transmission or BSR are present or not (S618). If the available UL-SCH resources are not present, the SR process is pending and steps S614 to S616 are repeated. In contrast, if the available UL-SCH resources are present, that is, if UL-SCH resources are allocated through UL grant, the triggered SR process is cancelled (S620). If the UL-SCH resources become available by the SR process, steps S606 to S612 are performed according to the BSR process.

Figure 7:
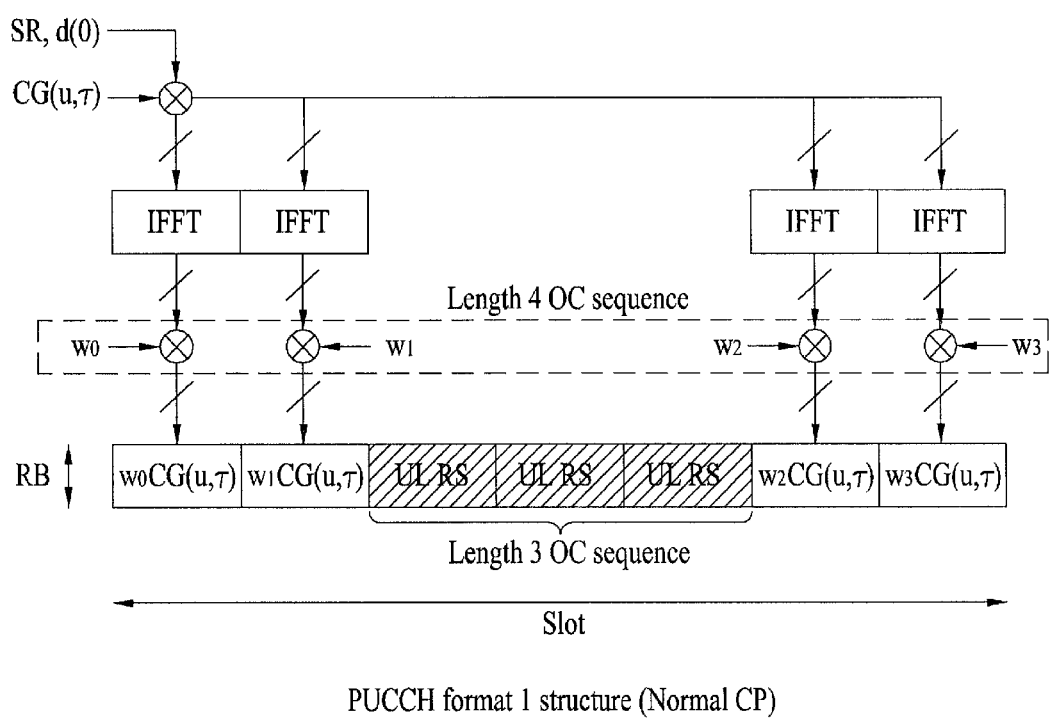
FIG. 7 illustrates a slot level structure of Physical Uplink Control Channel (PUCCH) formats.

FIG. 7 shows a slot level structure of a PUCCH format 1. The PUCCH format 1 is used to transmit Scheduling Request (SR). SR information is carried by the presence/absence of transmission of PUCCH from the UE (i.e., On-Off keying (OOK) modulation).

Referring to FIG. 7, the same control information is repeated within a subframe in slot units. Each UE transmits an SR signal through different resources including different cyclic shifts (CSs) (frequency domain codes) of a computer-generated constant amplitude zero auto correlation (CG-CAZAC) sequence and orthogonal covers (OCs) or orthogonal cover codes (OCCs) (time domain codes). The OC includes, for example, a Walsh/DFT orthogonal code. If the number of CSs is 6 and the number of OCs is 3, a total of 18 UEs may be multiplexed in a PRB in the case of using a single antenna. Orthogonal sequences w0, w1, w2 and w3 may be applied in a certain time domain (after FFT modulation) or a certain frequency domain (before FFT modulation). SR resources including CSs, OCs and PRBs may be provided to a UE through radio resource control (RRC).

Specifically, when the SR is triggered or pending in a SR subframe, a complex-valued symbol d(0)=1 is used. The complex-valued symbol d(0) may be multiplied with a cyclically shifted length $N_{seq}^{PUCCH}=12$ sequence $r_{u,v}^{(\alpha_p)}(n)$ for each of the P antenna ports used for PUCCH transmission according to $$y^{(\tilde{p})}(n) = \frac{1}{\sqrt{P}} d(0) \cdot r_{u,v}^{(\alpha_{\tilde{p}})}(n), n = 0, 1, \ldots, N_{seq}^{PUCCH} - 1$$

where $r_{u,v}^{(\alpha_{\tilde{p}})}(n)$ is the CG-CAZAC sequence with $N_{seq}^{PUCCH}=12$. The antenna-port specific cyclic shift $\alpha_{\tilde{p}}$ varies between symbols and slots as defined below.

The block of complex-valued symbols $y^{(\tilde{p})}(0), \ldots, y^{(\tilde{p})}(N_{seq}^{PUCCH}-1)$ may be scrambled by $S(n_s)$ and block-wise spread with the antenna-port specific orthogonal sequence $$w_{n_{oc}^{(\tilde{p})}}(i)$$

according to $$z^{(\tilde{p})}(m' \cdot N_{SF}^{PUCCH} \cdot N_{seq}^{PUCCH} + m \cdot N_{seq}^{PUCCH} + n) = S(n_s) \cdot w_{n_{oc}^{(\tilde{p})}}(m) \cdot y^{(\tilde{p})}(n)$$

where
m=0, ..., $N_{SF}^{PUCCH}-1$
n=0, ..., $N_{seq}^{PUCCH}-1$, and
m'=0.1

$$S(n_s) = \begin{cases} 1 & \text{if } n'_p(n_s) \bmod 2 = 0 \\ e^{j\pi/2} & \text{otherwise} \end{cases}$$

with $N_{SF}^{PUCCH}=4$ for both slots of normal PUCCH format 1, and $N_{SF}^{PUCCH}=4$ for the first slot and $N_{SF}^{PUCCH}=3$ for the second slot of shortened PUCCH format 1. The sequence $$w_{n_{oc}^{(\tilde{p})}}(i)$$

is given by Table 1 and Table 2. $n'_{\tilde{p}}(n_s)$ is defined later.

TABLE 1

| Sequence index $n_{oc}^{(\tilde{p})}(n_s)$ | Orthogonal sequences [w(0) ... w($N_{SF}^{PUCCH}-1$)] |
|---|---|
| 0 | [+1 +1 +1 +1] |
| 1 | [+1 −1 +1 −1] |
| 2 | [+1 −1 −1 +1] |

TABLE 2

| Sequence index $n_{oc}^{(\tilde{p})}(n_s)$ | Orthogonal sequences [w(0) ... w($N_{SF}^{PUCCH}-1$)] |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Resources used for transmission of PUCCH format 1 are identified by a resource index $n_{PUCCH}^{(1,\tilde{p})}$ from which the orthogonal sequence index $n_{oc}^{(\tilde{p})}(n_s)$ and the cyclic shift $\alpha_{\tilde{p}}(n_s,l)$ are determined according to following equations. $n_{PUCCH}^{(1,\tilde{p})}$ is provided by higher layers (e.g., RRC).

$$n_{oc}^{(\tilde{p})}(n_s) = \begin{cases} \lfloor n'_{\tilde{p}}(n_s) \cdot \Delta_{shift}^{PUCCH} / N' \rfloor & \text{for normal cyclic prefix} \\ 2 \cdot \lfloor n'_{\tilde{p}}(n_s) \cdot \Delta_{shift}^{PUCCH} / N' \rfloor & \text{for extended cyclic prefix} \end{cases}$$

$$\alpha_{\tilde{p}}(n_s, l) = 2\pi \cdot n_{cs}^{(\tilde{p})}(n_s, l) / N_{sc}^{RB}$$

$$n_{cs}^{(\tilde{p})}(n_s, l) = \begin{cases} \left[ n_{cs}^{cell}(n_s, l) + \left( \begin{array}{c} n'_{\tilde{p}}(n_s) \cdot \Delta_{shift}^{PUCCH} + \\ (n_{oc}^{(\tilde{p})}(n_s) \bmod \Delta_{shift}^{PUCCH}) \end{array} \right) \bmod N' \right] \bmod N_{sc}^{RB} & \text{for normal cyclic prefix} \\ \left[ n_{cs}^{cell}(n_s, l) + \left( \begin{array}{c} n'_{\tilde{p}}(n_s) \cdot \Delta_{shift}^{PUCCH} + \\ n_{oc}^{(\tilde{p})}(n_s)/2 \end{array} \right) \bmod N' \right] \bmod N_{sc}^{RB} & \text{for extended cyclic prefix} \end{cases}$$

where $$N' = \begin{cases} N_{cs}^{(1)} & \text{if } n_{PUCCH}^{(1,\tilde{p})} < c \cdot N_{cs}^{(1)} / \Delta_{shift}^{PUCCH} \\ N_{sc}^{RB} & \text{otherwise} \end{cases}$$

$$c = \begin{cases} 3 & \text{normal cyclic prefix} \\ 2 & \text{extended cyclic prefix} \end{cases}$$

$$N_{sc}^{RB} = 12$$

A cell-specific cyclic shift, $n_{cs}^{cell}(n_s,l)$, which varies with the symbol number l and the slot number $n_s$ according to $$n_{cs}^{cell}(n_s,l) = \sum_{i=0}^{7} c(8 N_{symb}^{UL} \cdot n_s + 8l + i) \cdot 2^i$$

where $c(\cdot)$ is a pseudo-random sequence. The pseudo-random sequence generator may be initialized with $c_{init}=N_{ID}^{cell}$ at the beginning of each radio frame. $N_{ID}^{cell}$ is a physical layer cell identity (Cell ID).

The resource indices within the two resource blocks in the two slots of a subframe to which the PUCCH is mapped are given by $$n'_{\tilde{p}}(n_s) = \begin{cases} n_{PUCCH}^{(1,\tilde{p})} & \text{if } n_{PUCCH}^{(1,\tilde{p})} < c \cdot N_{cs}^{(1)} / \Delta_{shift}^{PUCCH} \\ (n_{PUCCH}^{(1,\tilde{p})} - c \cdot N_{cs}^{(1)} / \Delta_{shift}^{PUCCH}) \bmod (c \cdot N_{sc}^{RB} / \Delta_{shift}^{PUCCH}) & \text{otherwise} \end{cases}$$

for $n_s$ mod 2=0 and by $$n'_{\tilde{p}}(n_s) = \begin{cases} [c(n'_{\tilde{p}}(n_s-1)+1)] \bmod (c N_{sc}^{RB} / \Delta_{shift}^{PUCCH} + 1) - 1 & \text{if } n_{PUCCH}^{(1,p)} < c \cdot N_{cs}^{(1)} / \Delta_{shift}^{PUCCH} \\ \lfloor h_{\tilde{p}}/c \rfloor + (h_{\tilde{p}} \bmod c) N' / \Delta_{shift}^{PUCCH} & \text{otherwise} \end{cases}$$

for $n_s$ mod $2=1$, where $h_{\bar{p}}=(n'_p(n_s-1)+d)$mod $(cN'/\Delta_{shift}^{PUCCH})$, with $d=2$ for normal CP and $d=0$ for extended CP.

The parameters deltaPUCCH-Shift $\Delta_{shift}^{PUCCH}$ is provided by higher layers.

The block of complex-valued symbols $z^{(\tilde{p})}(i)$ may be multiplied with the amplitude scaling factor $\beta_{PUCCH}$ in order to conform to the transmit power $P_{PUCCH}$, and mapped in sequence starting with $z^{(\tilde{p})}(0)$ to resource elements. PUCCH uses one resource block in each of the two slots in a subframe. Within the physical resource block used for transmission, the mapping of $z^{(\tilde{p})}(i)$ to resource elements (k,l) on antenna port p and not used for transmission of reference signals may be in increasing order of first k, then l and finally the slot number, starting with the first slot in the subframe.

Figure 8:
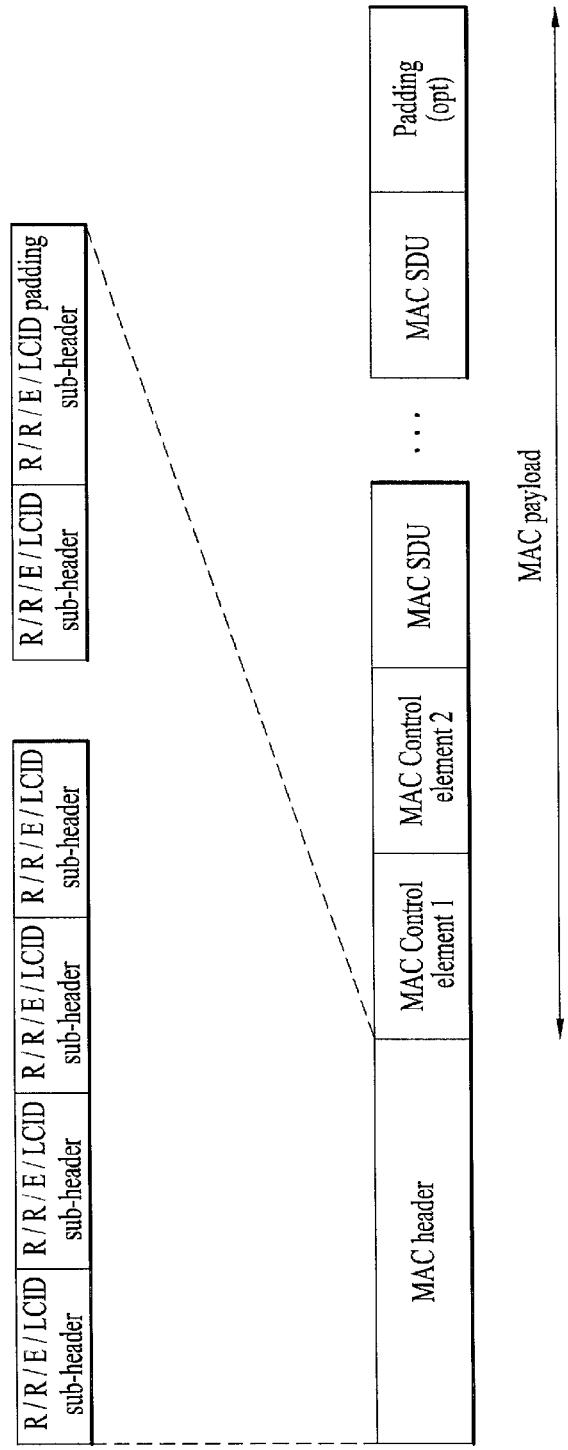
FIG. 8 illustrates a Medium Access Control (MAC) Protocol Data Unit (PDU).

FIG. 8 illustrates a MAC PDU. The MAC PDU consists of a MAC header, zero or more MAC Service Data Units (MAC SDU), zero, or more MAC Control Elements (CEs), and optionally padding. Both the MAC header and the MAC SDUs are of variable sizes. A MAC PDU header consists of one or more MAC PDU subheaders. Each subheader corresponds to either a MAC SDU, a MAC control element or padding. A MAC PDU subheader consists of the six header fields R/R/E/LCID/F/L but for the last subheader in the MAC PDU and for fixed sized MAC control elements. The last subheader in the MAC PDU and subheaders for fixed sized MAC control elements consist solely of the four header fields R/R/E/LCID. A MAC PDU subheader corresponding to padding consists of the four header fields R/R/E/LCID. MAC PDU subheaders have the same order as the corresponding MAC SDUs, MAC control elements and padding. MAC control elements are always placed before any MAC SDU.

The LCID field is a Logical Channel ID field. The LCID field identifies a logical channel instance of a corresponding MAC SDU or a type of a corresponding MAC control element or padding for Downlink Shared Channel (DL-SCH), Uplink Shared Channel (UL-SCH) and Multicast Channel (MCH) respectively. There is one LCID field for each MAC SDU, MAC control element or padding included in the MAC PDU. The LCID field size is 5 bits.

Table 3 shows values of LCID for UL-SCH.

TABLE 3

| Index | LCID values |
| --- | --- |
| 00000 | Common Control Channel (CCCH) |
| 00001-01010 | Identity of the logical channel |
| 01011-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

Figure 9:
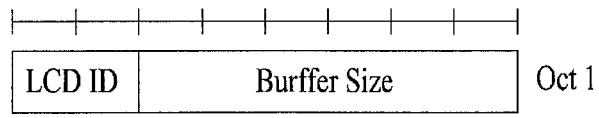
FIG. 9 illustrates Buffer Status Report (BSR) MAC Control Elements (MAC CEs).
Figure 9:
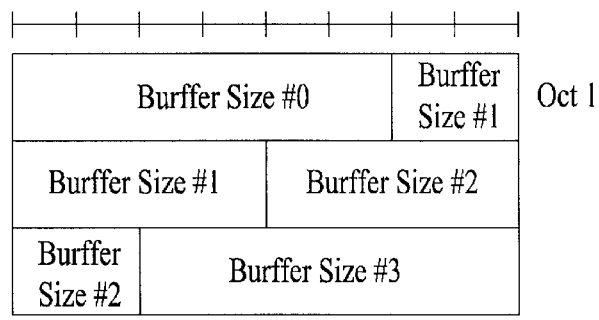

FIG. 9 illustrates Buffer Status Report (BSR) MAC Control Elements (MAC CEs).

Referring to FIG. 9, BSR MAC control elements consist of either:
  Short BSR and Truncated BSR format: one LCG ID field and one corresponding Buffer Size field; or
  Long BSR format: four Buffer Size fields, corresponding to LCG IDs #0 through #3. The BSR formats are identified by MAC PDU subheaders with LCIDs as specified in table 3.

The fields LCG ID and Buffer Size are defined as follow:
  LCG ID: The Logical Channel Group ID field identifies the group of logical channel(s) which buffer status is being reported. The length of the field is 2 bits;
  Buffer Size: This field identifies the total amount of data available across all logical channels of a logical channel group after all MAC PDUs for the TTI have been built. The amount of data is indicated in number of bytes. The amount of data may include all data that is available for transmission in the RLC layer and in the PDCP layer. Size of the RLC and MAC headers are not considered in the buffer size computation. The length of this field is 6 bits.

Proximity-Based Service (ProSe)

Recently, Proximity-based Service (ProSe) has been discussed in 3GPP. The ProSe enables different UEs to be connected (directly) to each other (after appropriate procedure(s), such as authentication), through an eNB only (but not further through Serving Gateway (SGW)/Packet Data Network Gateway (PDN-GW, PGW)), or through an SGW/PGW (this is referred to as an EPC (Evolved Packet Core) Path in 3GPP Release 12).

Figure 10:
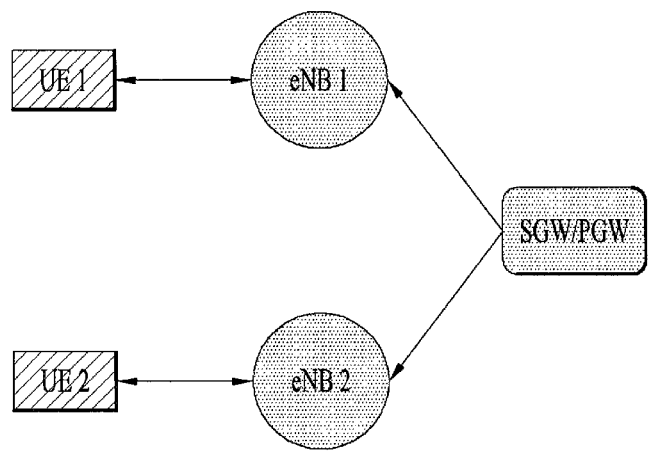
FIGS. 10~12 illustrate examples of data path scenarios for a proximity communication.
Figure 11:
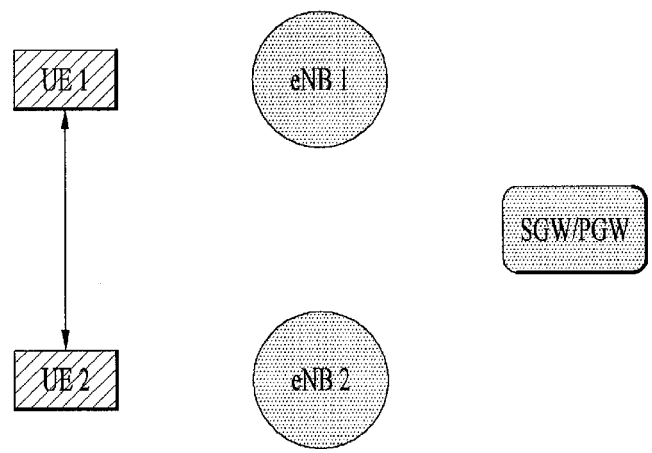
Figure 12:
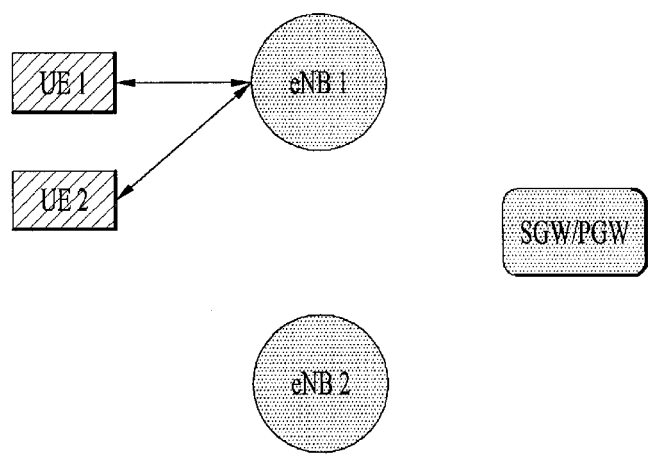

FIGS. 10~12 illustrate data path scenarios for a proximity-based service.

FIG. 10 shows a default data path in Evolved Packet System (EPS) for communication between two UEs (Scenario 1). When two UEs (e.g., UE1, UE2) in close proximity communicate with each other, their data path (user plane) goes via the operator network. Typical data path for this type of communication involves eNB(s) and/or Gateway(s) (GW(s)) (e.g., SGW/PGW). FIGS. 11~12 show data paths for a proximity communication (Scenario 2). If wireless devices (e.g., UE1, UE2) are in proximity of each other, they may be able to use a direct data path (FIG. 11) or a locally routed data path (FIG. 12) in the EPC for communication between two UEs. In the direct data path, wireless devices are connected directly to each other (after appropriate procedure(s), such as authentication), without an eNB and an SGW/PGW. In the locally routed data path, wireless devices are connected to each other through an eNB only.

The ProSe has various use cases and potential requirements for an operator network controlled discovery and communications between wireless devices that are in proximity, under continuous network control, and are served by E-UTRAN, for:
  1. Commercial/social use
  2. Network offloading
  3. Public Safety
  4. Integration of current infrastructure services, to assure the consistency of the user experience including reachability and mobility aspects
  5. Public Safety, in case of absence of EUTRAN coverage (subject to regional regulation and operator policy, and limited to specific public-safety designated frequency bands and terminals)

The Federal Communications Commission adopted a Third Report and Order (Order) and Fourth Further Notice of Proposed Rulemaking (FNPRM) that will significantly advance communications interoperability for our Nation's first responders. The rules adopted and proposed in today's Order and FNPRM support the build out of robust, dedicated and secure mobile broadband networks that will enable public safety broadband users to share information, videos, photos and emails across departments and jurisdictions nationwide for day-to-day operations and during large-scale emergencies.

The Order and FNPRM requires all 700 MHz public safety mobile broadband networks to use a common air interface, specifically Long Term Evolution (LTE), to support roaming and interoperable communications and seeks comment on additional rules to enable nationwide interoperability. The FCC's actions today build on the technical requirements that state and local 700 MHz broadband waiver recipients are already subject to in the early buildout of their regional public safety broadband networks.

The FNPRM seeks public comment on, among other things:

The architectural vision of the network;
The effectiveness of open standards;
Interconnectivity between networks;
Network robustness and resiliency;
Security and encryption; Coverage and coverage reliability requirements;
Roaming and priority access between public safety broadband networks; and
Interference coordination and protection.

Therefore, it is important and beneficial to devise practical methods for advanced services, such as Proximity-based Service (ProSe), to be able to operate in any available frequency band so that the service is available with highly guaranteed reliability.

In the discussion of Public safety with ProSe in the 3GPP, it is not the scope that a Public Safety UE operates the ProSe over the commercial. In 3GPP, it falls into the scope of Release 12 that Proximity-based Service (ProSe) is used for the Public Safety purpose.

Public Safety has a wide spectrum of applications. For example, in the United States, it includes the following:

Fire and Rescue services—includes fire prevention and suppression, all types of rescue services.
Ambulance and Emergency Medical Service (EMS)—usually only provides emergency medical transportation
Police and security guard licensing services—including crime prevention, suppression and investigation, uniformed patrol and response, and operates the Crimestoppers Program.
Emergency communications—operates the public interface emergency communications telephone system by providing the 9-1-1 and Enhanced 911 emergency telephone numbers.
Office of Emergency Services (OES)—plans for and operates the Emergency Operations Center during calamities, disasters, special events and emergencies.
Inspections and code enforcement—usually building safety, which includes construction, electrical et al. and/or vehicle inspections.
Animal control—This category could also include wildlife officers, game wardens and dog catchers.
DMV—includes administration of driver's licenses and license plates.

Public Safety ProSe communication requires very high standard of reliability and connectivity. As a solution for achieving this goal, i.e., reliability and connectivity, the use of commercial network band is proposed in this invention disclosure. Here, it is assumed that eNB is able to provide operations in commercial band and Public Safety band simultaneously.

Figure 13:
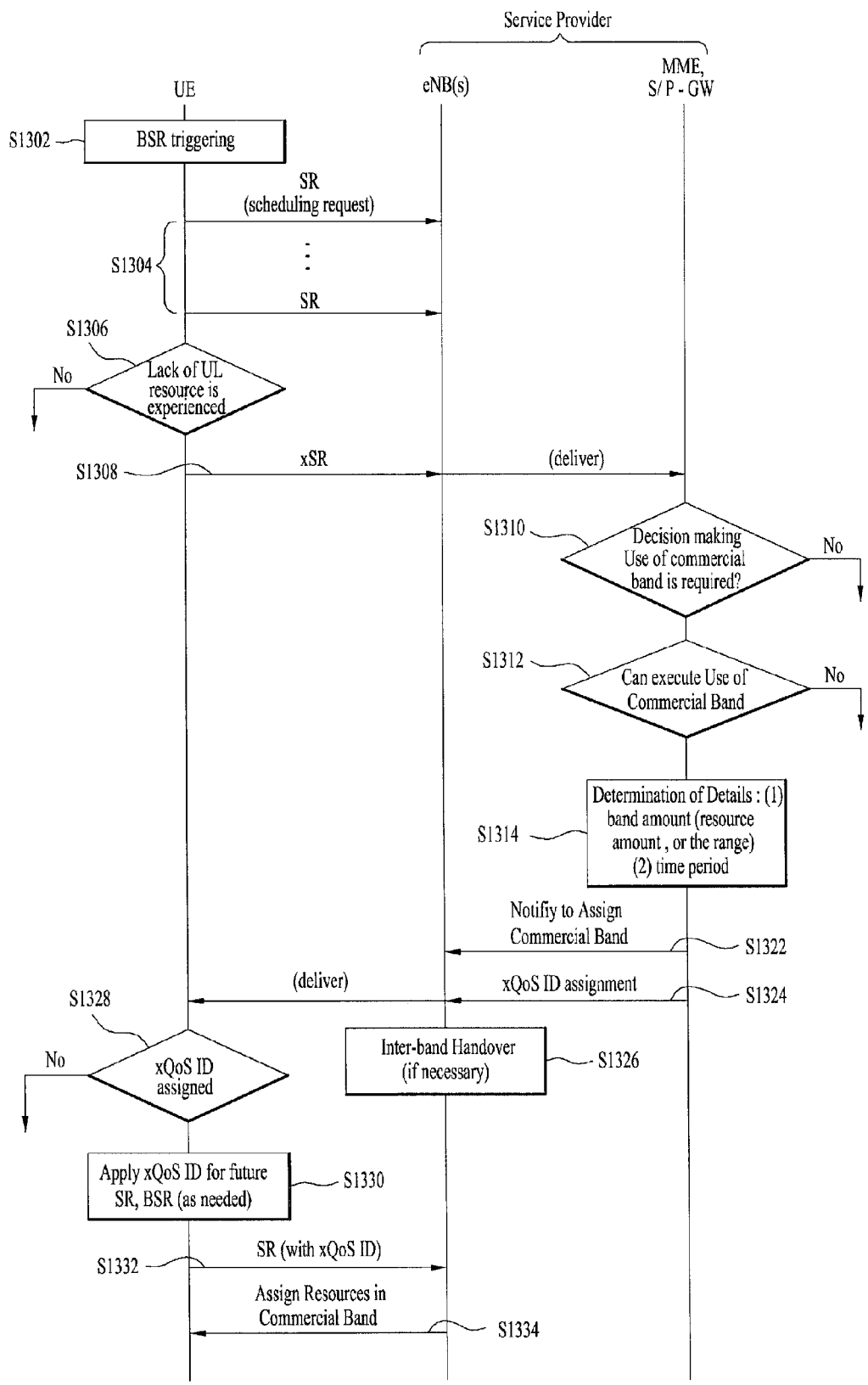
FIGS. 13~14 illustrate flow diagrams for Public Safety ProSe applications in accordance with examples of the present invention.

FIG. 13 illustrates a flow diagram for Public Safety ProSe applications. FIG. 13 shows a case of no online involvement of Public Safety center. Here, UE(s) refers to a Public Safety ProSe-enabled UE(s) otherwise specified, and it is assumed that the UE basically operates in a public safety band.

Referring to FIG. 13, if the UE has available UL data in a higher layer entity (e.g., PDCP entity, RLC entity), the UE may trigger a Buffer Status Report (BSR) procedure (S1302), and then may transmit a Scheduling Request (SR) to an eNB (S1304). However, if the UE has still suffered from getting lacked of channel resources (S1306), the UE may transmit "extra Scheduling Request (xSR)" to MME (S1308). Here, the SR in S1304 is used to request UL resource (e.g., UL-SCH resources) of the public safety band, and the xSR in S1308 is used to request UL resources (e.g., UL-SCH resources) of a commercial band. The SR and the xSR may be distinguished by using SR resources allocated by higher layers (e.g., $n_{PUCCH,SR}^{(1,\tilde{p})}$, $n_{PUCCH,xSR}^{(1,\tilde{p})}$. Alternatively, the SR and the xSR may be distinguished by using modulation symbol. For example, in FIG. 7, d(0)=1 may be used for a positive SR, and d(0)=M may be used for a positive xSR. Here, M may be −1, +j or −j for phase shift keying, and 2, −2, +2j or −2j for amplitude shift keying. Meanwhile, ACK/NACK transmission coincides with a SR subframe, a modulation symbol corresponding to ACK/NACK information is used as d(0) in FIG. 7. Thus, in order to avoid ambiguity, xSR may not be transmitted (e.g., dropped) at a SR subframe in which ACK/NACK transmission occurs. Alternatively, the SR and the xSR may be distinguished based on which subframe is used for SR transmission. For example, two sets of subframes may be reserved, in which the first set of subframes is used for SR transmission and the second set of subframes may be used for xSR transmission.

Here, the MME may be pre-negotiated with a Public Safety center regarding the use of commercial band for Public Safety ProSe. Upon receipt of the xSR, if the usage of commercial band is required (S1310) and if the usage of commercial band is executable (S1312), the MME may make a decision for the usage and necessary details (including the amount of resources and the time period for that usage) (S1314). Then, the MME may inform the eNB of this decision result (with details) (S1322), and also informs UE of "extra QoS ID (xQoS ID)" (S1324).

In order to provide a service using the commercial band, inter-band handover may be performed (S1326). For example, when a dedicated public safety eNB (which supports public safety band only) is running in proximity to commercial eNB, ProSe calls staying in the public safety eNB can be handed over to commercial eNB(s) and the commercial eNB can arrange the ProSe call in a ProSe mode. This requires a context transfer from public safety eNB to the commercial eNB. Based on the context received at the commercial eNB (target eNB), it can give priority or necessary favor to the public safety ProSe calls from the dedicated public safety eNB.

If the xQoS is assigned (S1328), the UE may use xQoS ID when it requests uplink resource later on (S1330). For example, the UE may transmit SR with the xQoS ID (or BSR with the xQoS ID) (S1332), and receive resource allocation for the commercial band (S1334).

As an example of implementation, the xQoS ID may be used in cyclic shifting CG-CAZAC sequence used for SR transmission. In particular, as explained referring to FIG. 7, in the conventional arts, the cyclic shift, $n_{cs}^{cell}(n_s,l)$ varies with the symbol number l and the slot number $n_s$ according to $$n_{cs}^{cell}(n_s,l)=\Sigma_{i=0}^{7}c(8N_{symb}^{UL}\cdot n_s+8l+i)\cdot 2^i$$

where c(·) is a pseudo-random sequence. The pseudo-random sequence generator may be initialized with $c_{init}=N_{ID}^{cell}$ at the beginning of each radio frame. $N_{ID}^{cell}$ is a physical layer cell identity (Cell ID).

In the present example, the xQoS ID may replace the Cell ID. Thus, in the above equation, $c_{init}$ may be generalized as $c_{init}=N_{ID}$ in which $N_{ID}$ may be the Cell ID or xQoS ID.

As another example of implementation, the xQoS ID may be used as a LCID in BSR transmission. In this case, table 3 may be modified as shown below.

Table 3 shows values of LCID for UL-SCH.

TABLE 4

| Index | LCID values |
|---|---|
| 00000 | Common Control Channel (CCCH) |
| 00001-01010 | Identity of the logical channel |
| xQoS ID | BSR for commercial band |
| 01011-11000 except xQoS ID | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

In addition, the MME (decision maker) can set a timer (time period for commercial band usage for Public Safety ProSe) and inform eNB and UE of this information so that they can come back to a Public Safety band after the timer expires. It is possible that the MME (decision maker) can notify the manual expiration/termination of the usage as an event-driven way.

The procedure depicted in FIG. 13 does not have Public Safety center involved and therefore all the major decisions are to be made by the MME (with pre-negotiation).

Figure 14:
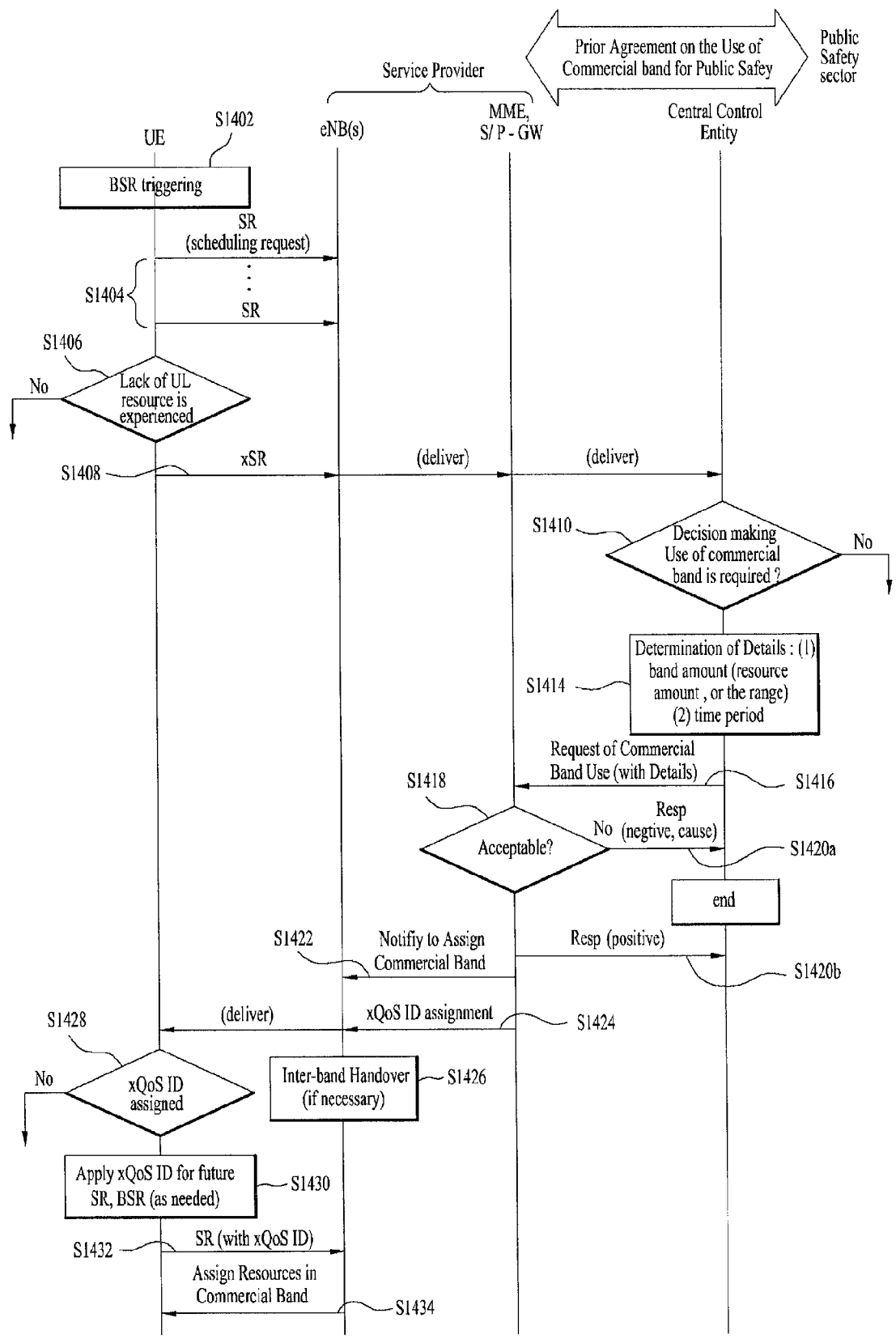

FIG. 14 illustrates another flow diagram for Public Safety ProSe applications. FIG. 14 shows a procedure where Public Safety center gets involved in the decision procedure. Here, UE(s) refers to a Public Safety ProSe-enabled UE(s) otherwise specified, and it is assumed that the UE basically operates in a public safety band.

Referring to FIG. 14, S1402~S1410, S1414 and S1422~S1434 are corresponding to S1302~S1310, S1314 and S1322~S1334 in FIG. 13, except a decision maker for usage of the commercial band is a central control entity, not the MME. Thus detailed explanation on S1402~S1410, S1414 and S1422~S1434 can be referred to those of FIG. 13. Differently from FIG. 13, in the procedure of FIG. 14, the central control entity may transmit a request of commercial band use (with details) to the MME (S1416). If the request is not acceptable (S1418), the MME transmits a negative response (with cause) to the central control entity (S1420a), then the procedure ends. Meanwhile, if the request is acceptable (S1418), the MME transmits a positive response to the central control entity (S1420b), then may inform the eNB of this decision result (with details) (S1422) and inform UE of "extra QoS ID (xQoS ID)" (S1424).

In above methods (as depicted in FIG. 13 and FIG. 14), the MME (or other appropriate network node) can inform an eNB of (the range of) the amount that is expected to accommodate Public Safety ProSe so that the eNB can be aware of how to configure Radio Access Network (RAN) parameters under its control.

EXAMPLE

Let f(load, channel resource amount) denote a QoS index when load and channel resource amount is given in the commercial network band. f(a, b) may be an arbitrary function that can be employed by a skilled artisan in the art, regarding QoS index.

One example is that a target QoS index is set to f1 when the amount of available channel resource (including those being occupied by the commercial users) is R1. Then, the question is how to find the tractable level of load when a portion of channel resource is to be allocated to Public Safety ProSe.

L1: load is "normal" (i.e., no Public safety ProSe onto the commercial network band)

R1: channel resource amount is "normal" (i.e., no Public safety ProSe onto the commercial network band); the amount of channel resource that commercial UEs can use f1:=f(L1, R1)

L2: load is "extra" (i.e., Public safety ProSe is using the commercial network band)

R2: channel resource amount is "extra" (i.e., Public safety ProSe is using the commercial network band), which means R2<R1; namely, Public safety ProSe is using (R1-R2)

f2:=f(L2, R2)

Then, the L2 can be estimated by

L2*=MAXIMUM {0, argmin_{L2} {f(L2, R2)=f(L1, R1)}}.

If DL resource runs short, the eNB can inform MME (or decision maker) of the DL shortage.

Figure 15:
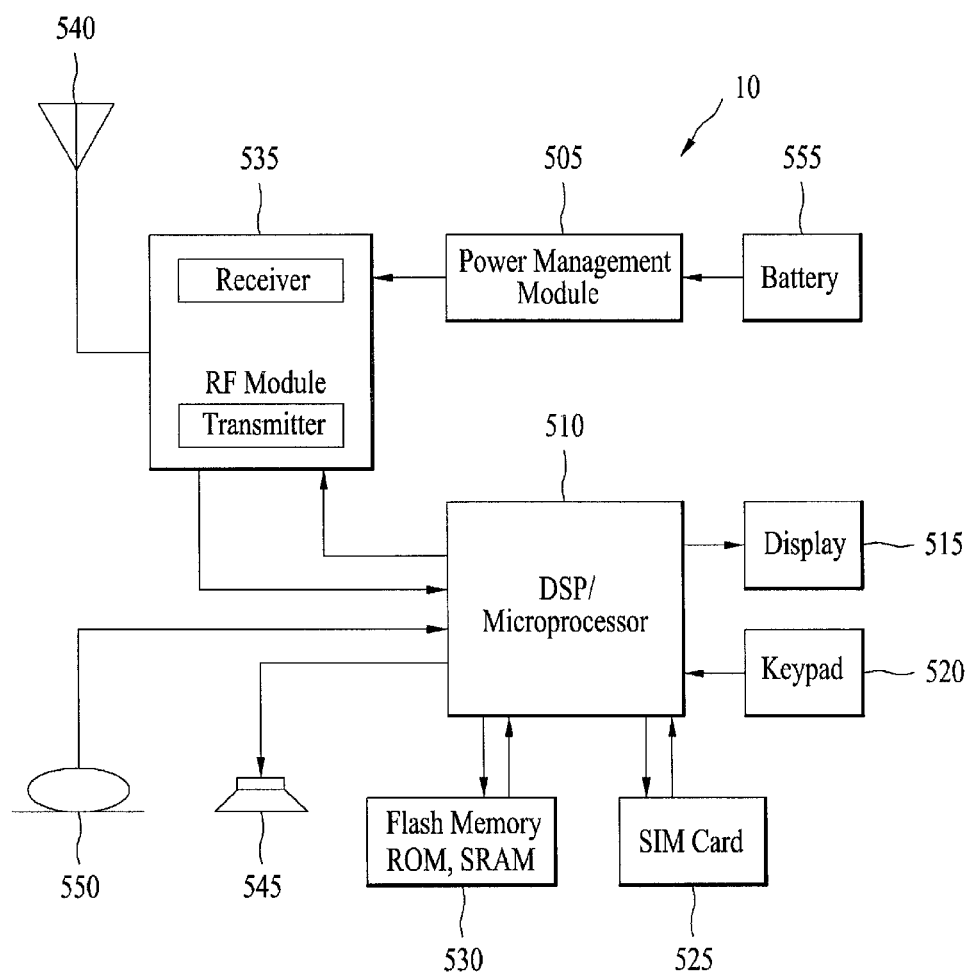
FIG. 15 illustrates a block diagram of a User Equipment (UE).

FIG. 15 illustrates a block diagram of a UE or Mobile Station (MS) 10. The UE 10 includes a MTC device or a delay-tolerant device. The UE 10 includes a processor (or digital signal processor) 510, RF module 535, power management module 505, antenna 540, battery 555, display 515, keypad 520, memory 530, SIM card 525 (which may be optional), speaker 545 and microphone 550.

A user enters instructional information, such as a telephone number, for example, by pushing the buttons of a keypad 520 or by voice activation using the microphone 550. The microprocessor 510 receives and processes the instructional information to perform the appropriate function, such as to dial the telephone number. Operational data may be retrieved from the Subscriber Identity Module (SIM) card 525 or the memory module 530 to perform the function. Furthermore, the processor 510 may display the instructional and operational information on the display 515 for the user's reference and convenience.

The processor 510 issues instructional information to the RF module 535, to initiate communication, for example, transmits radio signals comprising voice communication data. The RF module 535 comprises a receiver and a transmitter to receive and transmit radio signals. An antenna 540 facilitates the transmission and reception of radio signals. Upon receiving radio signals, the RF module 535 may forward and convert the signals to baseband frequency for processing by the processor 510. The processed signals would be transformed into audible or readable information outputted via the speaker 545, for example. The processor 510 also includes the protocols and functions necessary to perform the various processes described herein.

The aforementioned embodiments are achieved by combination of structural elements and features of the present invention in a predetermined fashion. Each of the structural elements or features should be considered selectively unless specified otherwise. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with other claims referring to the other claims other than the specific claims to constitute the embodiment or add new claims by means of amendment after the application is filed.

The embodiments of the present invention have been described based on data transmission and reception between a BS (or eNB) and a UE. A specific operation which has been described as being performed by the eNB (or BS) may be performed by an upper node of the BS (or eNB) as the case may be. In other words, it will be apparent that various operations performed for communication with the UE in the network which includes a plurality of network nodes along with the BS (or eNB) can be performed by the BS or network nodes other than the BS (or eNB). The BS may be replaced with terms such as fixed station, Node B, eNode B (eNB), and access point. Also, the term UE may be replaced with terms such as mobile station (MS) and mobile subscriber station (MSS).

The embodiments according to the present invention can be implemented by various means, for example, hardware, firmware, software, or combinations thereof. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a module, a procedure, or a function, which performs functions or operations as described above. Software code may be stored in a memory unit and then may be driven by a processor. The memory unit may be located inside or outside the processor to transmit and receive data to and from the processor through various well known means.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

The present invention can be applied to a method and an apparatuses for a proximity-based service, specifically, a proximity-based service for public safety.

The invention claimed is:

1. A method of performing a Proximity-based Service (ProSe) by a Public Safety ProSe-enabled User Equipment (UE) in a cellular communication system, the method comprising:

establishing a connection with a network via a public safety band;
transmitting a Scheduling Request (SR) signal to the network via the public safety band;
receiving a first resource allocation from the network; and
performing the ProSe using the first resource allocation,
wherein if a condition including a lack of channel resources is not satisfied, the SR signal carries a first identifier used for requesting resource of the public safety band,
wherein if the condition including the lack of channel resources is satisfied, the SR signal carries a second identifier used for requesting resource of a non-public safety band,
wherein the SR signal is generated by using below sequence:

$$y^{(\tilde{p})}(n) = \frac{1}{\sqrt{P}} d(0) \cdot r_{u,v}^{(\alpha_{\tilde{p}})}(n), \quad n = 0, 1, \ldots, N_{seq}^{PUCCH} - 1$$

where P is a number of antennas used for Physical Uplink Control Channel (PUCCH) transmission, d(0) a complex-valued symbol, $r_{u,v}^{(\alpha_{\tilde{p}})}$ is a length $N_{seq}^{PUCCH}$ sequence for each of P antenna ports, and $N_{seq}^{PUCCH}$ is 12,
where $r_{u,v}^{(\alpha_{\tilde{p}})}(n)$ is cyclically shifted using the first identifier or the second identifier.

2. The method of claim 1, wherein the first identifier includes a Cell Identifier (Cell ID), and the second identifier includes an identifier allocated by the network.

3. The method of claim 1, wherein $\alpha_{\tilde{p}}$ is a cyclic shift determined using below value:

$$n_{cs}^{cell}(n_s, l) = \Sigma_{i=0}^{7} c(8N_{symb}^{UL} \cdot n + 8l + i) \cdot 2^i$$

where is $n_s$ a slot number, l is a Single Carrier Frequency Division Multiple Access (SC-FDMA) symbol number, $N_{symb}^{UL}$ is a number of SC-FDMA symbols in a slot, and $c(\cdot)$ is a pseudo-random sequence initialized with $c_{init}$, and
$c_{init}$ is the first identifier or the second identifier.

4. The method of claim 1, further comprising:
receiving time information and a second resource allocation from the network as a result of the SR signal carrying the second identifier,
wherein the second resource allocation is valid only for a time period indicated by the time information.

5. A Public Safety Proximity-based Service (ProSe)-enabled User Equipment (UE) configured to perform a ProSe in a wireless communication system, the Public Safety ProSe-enabled UE comprising:
a radio frequency (RF) unit; and
a processor, wherein the processor is configured:
to establish a connection with a network via a public safety band,
to transmit a Scheduling Request (SR) signal to the network via the public safety band,
to receive a first resource allocation from the network, and
to perform the ProSe using the first resource allocation,
wherein if a condition including a lack of channel resources is not satisfied, the SR signal carries a first identifier used for requesting resource of the public safety band, wherein if the condition including a lack of channel resources is satisfied, the SR signal carries a second identifier used for requesting resource of a non-public safety band, wherein the SR signal is generated by using below sequence:

$$y^{(\tilde{p})}(n) = \frac{1}{\sqrt{P}} d(0) \cdot r_{u,v}^{(\alpha_{\tilde{p}})}(n), \quad n = 0, 1, \ldots, N_{seq}^{PUCCH} - 1$$

where P is a number of antennas used for Physical Uplink Control Channel (PUCCH) transmission, $d(0)$ a complex-valued symbol, $r_{u,v}^{(\alpha_{\tilde{p}})}$ is a length $N_{seq}^{PUCCH}$ sequence for each of P antenna ports, and $N_{seq}^{PUCCH}$ is 12, where $r_{u,v}^{(\alpha_{\tilde{p}})}(n)$ is cyclically shifted using the first identifier or the second identifier.

6. The Public Safety ProSe-enabled UE of claim 5, wherein the first identifier includes a Cell Identifier (Cell ID), and the second identifier includes an identifier allocated by the network.

7. The Public Safety ProSe-enabled UE of claim 5, wherein $\alpha_{\tilde{p}}$ is a cyclic shift determined using below value:

$$n_{cs}^{cell}(n_s,l) = \Sigma_{i=0}^{7} c(8N_{symb}^{UL} \cdot n + 8l + i) \cdot 2^i$$

where $n_s$ is a slot number, l is a Single Carrier Frequency Division Multiple Access (SC-FDMA) symbol number, $N_{symb}^{UL}$ is a number of SC-FDMA symbols in a slot, and $c(\cdot)$ is a pseudo-random sequence initialized with $c_{init}$, and $c_{init}$ is the first identifier or the second identifier.

8. The Public Safety ProSe-enabled UE of claim 5, wherein the processor is further configured to receive time information and a second resource allocation from the network as a result of the SR signal carrying the second identifier, wherein the second resource allocation is valid only for a time period indicated by the time information.

* * * * *